UNITED STATES PATENT OFFICE.

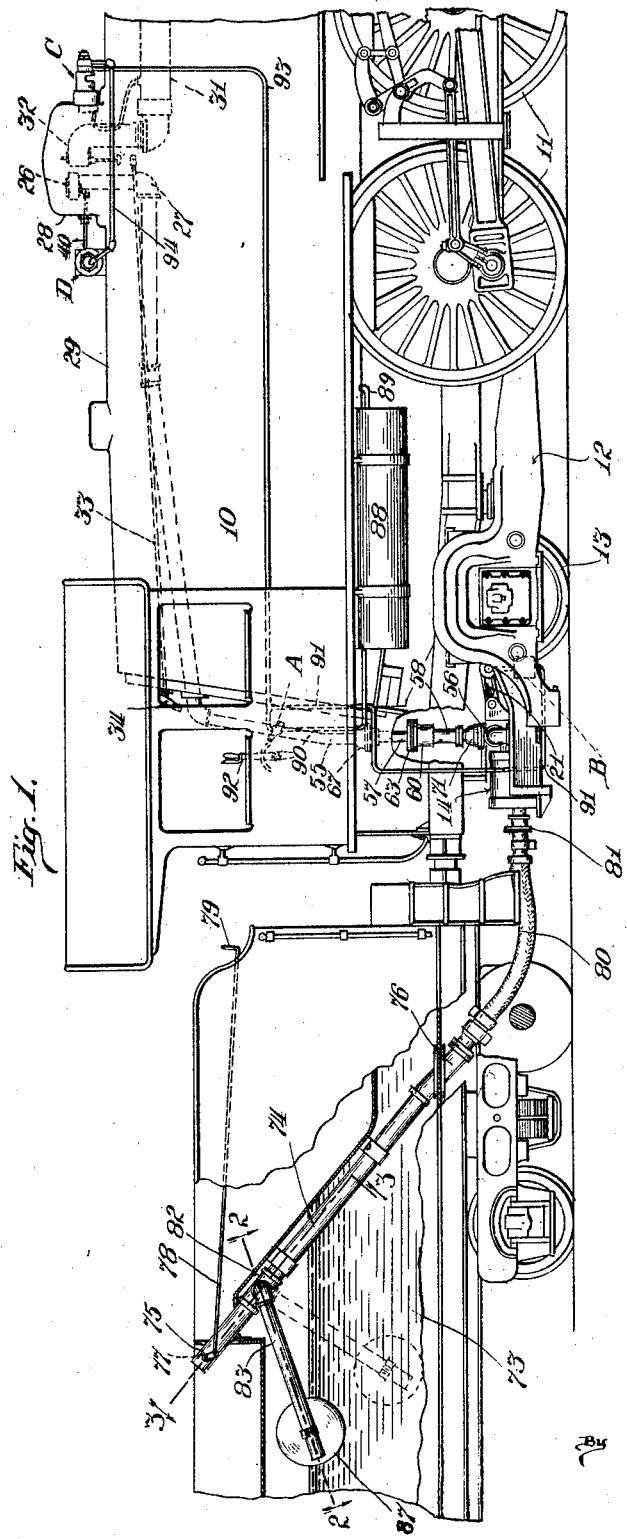

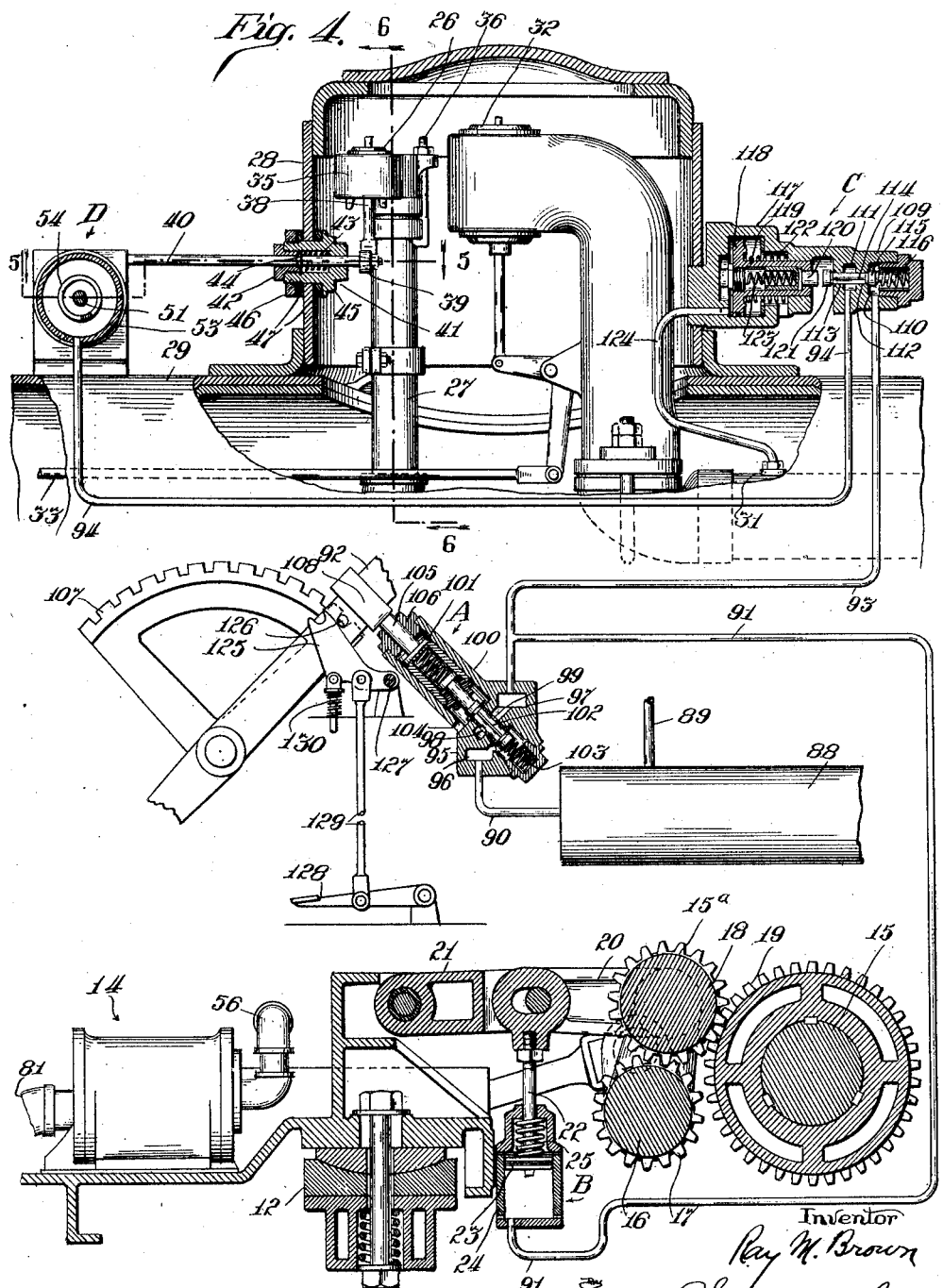

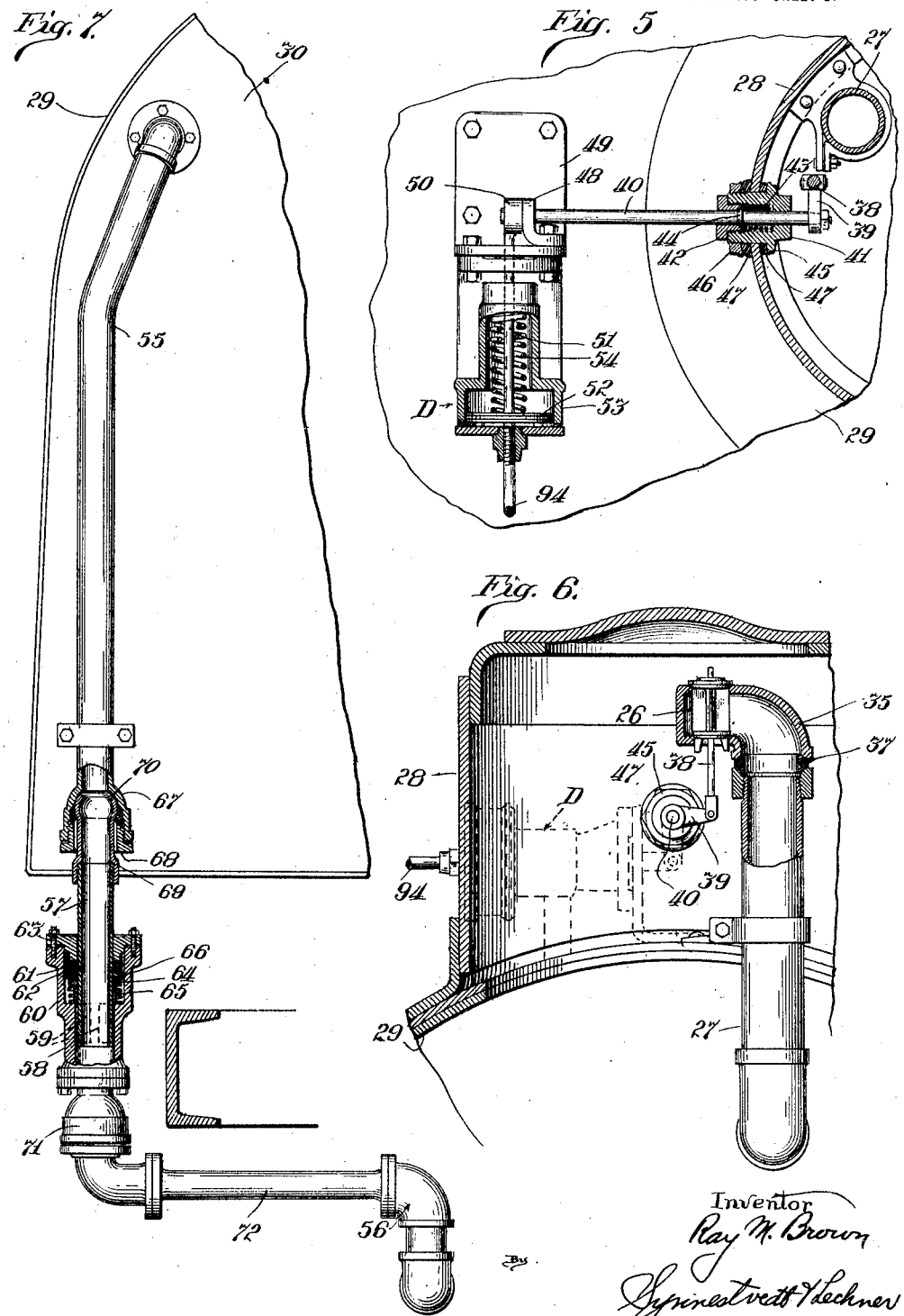

RAY M. BROWN, OF YONKERS, NEW YORK, ASSIGNOR TO HOWARD L. INGERSOLL, OF WHITE PLAINS, NEW YORK.

BOOSTER-ENGINE FOR STEAM-LOCOMOTIVES.

1,395,476.  Specification of Letters Patent.  Patented Nov. 1, 1921.

Application filed April 28, 1920. Serial No. 377,145.

*To all whom it may concern:*

Be it known that I, RAY M. BROWN, a citizen of the United States, residing at Yonkers, in the county of Westchester, and State of New York, have invented certain new and useful Improvements in Booster - Engines for Steam-Locomotives, of which the following is a specification.

My invention relates to an auxiliary or booster motor for locomotives for increasing traction in starting the locomotive and in running at low speeds, of the character described and claimed in certain applications for Letters Patent of Howard L. Ingersoll. One of these applications, Serial No. 299,037, filed May 22, 1919 (patented as Patent No. 1,339,395, May 11, 1920), illustrates and describes, as a preferred embodiment of the invention therein covered, a steam actuated booster engine, adapted to drive the trailer truck axle of a steam propelled locomotive, the control of which is made dependent upon the customary manipulations by the engine man of the locomotive reverse and main throttle levers, and also (so far as the putting into operation of the booster is concerned) upon the manipulation, at the will of the engine man, of a separate controlling device. The control system is, therefore, semi-automatic. In the application of the same inventor, Serial No. 305,649 filed June 20, 1919, a control system for the booster is disclosed which is entirely automatic in the sense that the booster is put into and out of operation without any volitional acts on the part of the engine man other than those involved in the customary manipulations of the reverse and throttle levers controlling the main driving means of the locomotive. While the present invention is not to be considered as limited strictly to the apparatuses shown in these two applications, its principal object is, nevertheless, to provide certain improvements relating to the traction increasing mechanisms exemplified therein, my invention consisting, primarily, in certain improvements upon parts of the apparatus, as follows: A simplified and novel mechanism for operating the booster throttle valve; improved means for conducting the steam to the booster motor, including a device which acts to automatically throttle inflow in case the wheels driven by the booster start to slip and the booster to race; and certain novel arrangements for discharging, collecting and condensing the exhaust steam from the booster. Additional incidental features of improvement will be adverted to in describing the preferred form of the invention shown in the accompanying drawings, wherein—

Figure 1 is a fragmentary view, in elevation, of a locomotive of a common type and its tender provided with the traction increasing apparatus with which my invention is concerned.

Figs. 2 and 3 are sectional views on lines 2—2 and 3—3, respectively, of Fig. 1, looking, in each case, in the direction indicated by the arrows.

Fig. 4 is a diagrammatic view illustrating the control system for the booster and its throttle valve, and means for governing the movements thereof, this figure showing the parts of the apparatus in the positions which they assume after the reverse lever has been put into the corner but before the throttle lever has been manipulated to open the locomotive throttle valve.

Figs. 5 and 6 are sectional views taken on lines 5—5 and 6—6, respectively, of Fig. 4, and Fig. 7 is a fragmentary view, in elevation, with parts in section, of the back plate of the locomotive boiler and the steam supply conduit leading from the boiler to the booster.

Like characters of reference designate like parts in the several figures of the drawings.

Referring to the drawings, 10 designates a locomotive having main driving wheels 11 and a radial trailer truck 12 supported on wheels 13. The booster motor 14 is carried on the trailer truck 12 and is adapted to drive the axle 15 (Fig. 4) of trailer truck wheels 13.

The wheels 13 are normally idle wheels. The function of the booster is to increase the traction of the locomotive in starting and in running at low speeds by applying power to these wheels through their axle 15 with which the booster is geared. After the locomotive reaches a given speed steam is cut off from the booster and the booster is thereupon disentrained from axle 15. Any suitable means may be employed for entraining and disentraining the booster from the axle. Mechanism for this purpose is shown in the lower part of Fig. 4 and consists of the following parts: 16 is a crank shaft adapted to be driven by the booster, this shaft being provided with a gear 17 in mesh with a gear 18 carried by a toggle mechanism 20, 21, the members of which are given angular movement with respect to each other by being connected at their place of articulation with the piston rod 22 of an air motor B, the latter consisting of a piston 23 and a cylinder 24 against the upper surface of which bears a coiled spring 25. By action of the motor B the gear 18 is moved into and out of mesh with a gear 19 on axle 15.

The control of steam to the booster motor is effected through the movements of a throttle valve 26 arranged at the upper end of a dry pipe 27 which projects into the steam dome 28 of the locomotive boiler 29, the other end of the dry pipe extending through the back plate 30 of the boiler. 31 designates the dry pipe of the main driving means of the locomotive, 32 the main throttle valve and 33 the rod for operating valve 32 which is connected with the throttle lever 34 in the cab of the locomotive.

The booster throttle 26 is arranged in an elbow fitting 35 secured to the upper end of the dry pipe 27 by means of bolts 36 with the interposition of a packing ring 37. Valve 26 has a stem 38 connected to a crank 39 on the end of rock shaft 40 which extends through a stuffing box in the side of the steam dome. The stuffing box as shown consists of a thimble 41 and a gland 42 having a beveled inner end against which is pressed by spring 43 the conical face of a boss 44 formed on rock shaft 40. The thimble has a head 45 and is secured to the steam dome by a nut 46, packing rings 47 being interposed between the wall of the steam dome and the head and nut, respectively. The outer end of rock shaft 40 is supported in a bracket 48 formed on a casting 49 secured to the top of the boiler and is provided with a crank 50 which is connected with a piston rod 51 forming part of a fluid pressure motor D, the piston 52 of which is arranged in a cylinder 53 adapted to receive compressed air, as will be hereinafter described. The piston 52 is normally held to the outer end of the cylinder 53 by a spring 54.

Steam admitted into the booster dry pipe 27 when valve 26 is opened passes to the booster motor through a conduit comprising a section of pipe 55 fixed to the back plate of the boiler, a section of pipe 56 fixed to the booster motor and a pair of telescoping members 57, 58 connected, respectively, to pipe sections 55, 56 by flexible joints. The member 57 extends into member 58 which is formed with guiding pads 59 for centering the end of member 57. The outer end of the conduit member 58 is formed with an enlargement 60 in which is arranged, within a shell 61, a body of packing 62 held between a gland 63 and a sleeve 64, the latter under pressure from a coil spring 65. A ring 66 is interposed between sleeve 64 and the packing 62. A ball and socket joint is provided between the pipe sections 55 and 57 constructed preferably as follows: 67 is a bell secured to pipe 55 and having screwed into the end of the same a gland 68 which surrounds a tubular extension member 69 fastened to pipe 57, the member 69 having a ball portion 70 against which the end of gland 68 bears. A similar ball and socket joint, designated 71, is arranged between pipe sections 56 and 58. The conduit thus formed has sufficient flexibility to permit movements of the booster motor, incident to the movements of the track on which it is mounted, in respect to the body of the locomotive.

A choking device is preferably provided in this conduit for automatically checking inflow of steam in case the trailer truck wheels slip and the motor starts to race. This choking device consists of a short pipe section 72 of smaller internal diameter than the internal diameter of the rest of the conduit, for example, it may be two inches in diameter while the rest of the conduit has a diameter of three and one-half inches.

My invention contemplates discharging the exhaust steam from the booster into the water tank on the tender. The preferred arrangement provides a float controlled discharge pipe insuring introduction of the exhaust steam below the water level in the tank but near said water level so as to avoid appreciable back pressure on the engine. An arrangement is also provided, preferably, whereby the exhaust steam, if desired, may be discharged into the atmosphere. 73 designates the water tank on the tender, 74, 75, 76 a pipe extending through the top and bottom of the water tank, the upper section 75 of which is provided with a valve 77 adapted to be opened and closed by a pull rod 78, the handle 79 of which is in reach of the fireman in the locomotive cab. The lower section 76 of the pipe is connected by a rubber hose 80 with the exhaust pipe 81 of the booster. Between pipe sections 74, 75 is a cross fitting 82 to which are pivoted on opposite sides a pair of discharge pipes 83, 83 provided with nipples 84 which turn in the cross fitting. Pipes 83 are connected by a rod 85 secured to the pipes by clamps 86 and on this rod is supported a float 87. The parts are so proportioned that the discharge ends of pipes 83 are held just below the water level in tank 72. If the water in the tank becomes too hot valve 77 may be opened to discharge the exhaust steam to the atmosphere. By means of the arrangements described the exhaust steam from the booster is condensed and the heat utilized for raising the temperature of the feed water in the tender tank, thus minimizing the cost of operating the booster and making it possible to eliminate the steam injector used in winter weather to keep the water in the tank from freezing. The preheating of the feed water is an advantage in itself.

I will next explain the system of control whereby the booster motor is put into and out of operation through manipulation of the reverse and throttle levers of the locomotive. This control system, however, in its general features, is not a part of my invention, being the system described and claimed in application Serial No. 299,037 above mentioned. 88 is a tank containing air under pressure. This tank may be kept supplied through pipe 89 connecting it with the main compressed air reservoir of the air brake system. The numerals 90, 91 designate a pipe which leads from the air tank 88 through a controlling device A to the air motor B which has been described as operating the mechanism for entraining and disentraining the booster motor from the axle 15 of the trailer truck. The controlling device A is actuated when the reverse lever 92 is put into the extreme forward position, for starting the locomotive, to put pipe sections 90, 91 in communication with each other. A pipe 93, 94 leads from pipe 91 to the air motor D which controls the booster throttle valve 26, communication between pipe sections 93, 94 being under control of a controlling device C actuated by the presence of steam in the main dry pipe 31 of the locomotive.

The controlling device A comprises a casing 95 formed with a chamber 96 to which pipe 90 leads and a chamber 97 from which pipe 91 leads, said chambers communicating through ports 98, 99. Formed integrally with casing 95 is a cylinder 100 in which is arranged a plunger 101 adapted to bear against the upper head of a double headed valve 102 located in port 98, and the lower head of which is normally seated by pressure of a spring 103. 104 is an exhaust port in the side of the cylinder. The plunger 101 is formed with a stud 105 projecting through a gland 106 closing the upper end of the cylinder. When the reverse lever 92 is moved to its extreme forward position on quadrant 107 the block 108 on the lever bears against stud 105 on plunger 101 and moves valve 102 to seat the upper head thereof and unseat the lower head. Air is admitted from pipe 90 into pipes 91 and 93. The pressure in pipe 91 operates the fluid pressure motor B to entrain the booster motor with axle 15 by causing gear 19 to be meshed with the gear 15ª on the axle.

The controlling device C is constructed as follows: 109 is a casing having a chamber 110 to which pipe 93 leads and a chamber 111 from which leads pipe 94, these chambers being in communication through a port 112 alining with a port 113 leading from chamber 111 to the atmosphere. A double headed valve 114 is arranged in ports 112, 113, its outer head 115 being seated by a coil spring 116. Formed integrally with casing 109 is a cylinder 117 in which is a piston 118 having a hollow stem 119 in which is arranged a plunger 120 which is adapted to bear against the head 121 of the double valve 114. A spring 122 bears against piston 118 and a spring 123 against plunger 120. 124 is a pipe leading from the main dry pipe 31 of the locomotive to cylinder 117. Valve 114 blocks the flow of air pressure from pipe 93 to pipe 94 until steam has been admitted to the dry pipe 31 leading to the main cylinders of the locomotive, whereupon the valve is moved to allow air to pass into pipe 94 and through this pipe to the fluid pressure motor D which operates the booster throttle valve.

In order to make the putting into operation of the booster impossible, except through intentional act of the engine man, (when such feature of control is desirable) a dog 125 is arranged to normally stand in the path of a stud 126 on the reverse lever 92 to prevent the reverse lever from being moved to the extreme forward position on the quadrant. This dog is pivoted at 127 and is retracted so as to allow the reverse lever to be moved to a position to actuate the controlling device A by means of a treadle 128 connected to the dog by a rod 129. A spring 130 returns the dog to its normal position when the treadle is released.

*Summary of operation.*—When the engine man moves his reverse lever to the forward position in starting the locomotive, if he wishes to employ the booster for assisting the main driving means in getting the locomotive under way, the dog 125 is retracted by pressure on treadle 128 which allows the block 108 on the reverse lever to come in contact with the stud 105 of plunger 101. The plunger seats the upper head of the double valve 102, unseating the lower head and thereby allows air pressure from tank 88 to pass from pipe 90 through pipe 91 to the fluid pressure actuated device B causing the latter to mesh gear 18 with gear 19 and thus entrain the booster motor with the axle 15 of the trailer truck of the locomotive. When the controlling device A is actuated, as above described, air passes into pipe 93 and as soon as the main throttle lever of the locomotive is moved to admit steam to the main dry pipe 31 the double valve 114 is moved by steam pressure exerted against piston 118 and transmitted to the valve through plunger 120 to permit the pressure to pass through pipe 94 and to the fluid pressure actuated device D which is thereby actuated to open the booster throttle valve 26. Steam from the steam dome is admitted to the booster dry pipe 27 and passes through conduits 55, 57, 58, 59 to the booster motor. The exhaust steam from the booster motor passes into pipe 76, 74 through the hose connection 80 and is discharged through pipes 83 into the water tank 72 of the tender below the level of the water. If the water in the tank should reach too high a temperature the fireman, by manipulation of pull rod 78, can open the valve 77 in the extension 75 of pipe 74 which permits the exhaust steam to escape to the atmosphere. In the ordinary operation of the locomotive, when a certain speed has been attained, for example ten or twelve miles per hour, the reverse lever is moved back a few notches to shorten the valve movement. When this is done the double valve 114 of the controlling device A being released from pressure of plunger 101, is moved by its spring 103 to close communication between pipe 90 on the one side and pipes 91, 93 on the other, opening a way of exhaust for the latter and the pressure actuated devices associated therewith through the exhaust port 104. The springs in the fluid pressure motors D and B effect, respectively, the closing of the booster throttle valve 26 and the disengagement of gear 18 from gear 19. In this way the booster is put out of operation when the locomotive reaches a speed which, in accordance with the ordinary practice employed in the control of locomotives, will be approximately the same in all cases. The operation is automatic in the sense that it requires no volitional acts by the engine man other than those which he would naturally perform in the control of the main driving means of the locomotive. If the wheels 13 which are driven by the booster motor, should slip, the tendency of the motor to race is checked to a large extent by the choking of the steam which takes place due to the relatively small diameter of the pipe section 72 forming part of the booster supply conduit, which thus acts as an automatic governor.

I claim:

1. In combination with the boiler of a steam locomotive, a booster motor for the locomotive, a throttle valve located within the boiler, and means for operating the throttle valve comprising a rock shaft extending through the wall of the boiler, operating connections between the shaft and the valve, and means outside the boiler for rotating said shaft.

2. In combination with the boiler of a steam locomotive having a steam dome, a booster motor having a steam supply pipe extending into said steam dome, a throttle valve at the upper end of said pipe, a rock shaft extending through the side of the dome having operating connections with the valve, and means outside of the boiler for rotating the shaft.

3. In combination with the boiler of a steam locomotive having a steam dome, a booster motor having a steam supply pipe extending into said steam dome, a throttle valve at the upper end of said pipe, a rock shaft extending through the side of the dome having a crank on its inner end with which the stem of said valve is connected, a crank on the outer end if the shaft, and a fluid pressure actuated device connected with the last mentioned crank for rotating said shaft and operating the valve.

4. In combination with the boiler of a steam locomotive having a steam dome, a booster motor for the locomotive, a steam supply pipe for the booster motor extending into said steam dome, a fitting on the upper end of said pipe provided with a vertically movable valve having a stem, a stuffing box arranged in the side of the steam dome, a rock shaft extending through said stuffing box and provided at its inner end with a crank connected with the stem of said valve, a crank on the outer end of said rock shaft, a cylinder and piston therein having a piston rod connected with the crank at the outer end of the rock shaft, and means for introducing a pressure fluid into the cylinder to move the piston in one direction, and a spring to move the piston in the opposite direction.

5. In combination with a locomotive having a trailer truck, a booster motor arranged on said truck for driving the axle thereof, and a steam supply pipe for the booster having sections fixed to the boiler of the locomotive and to the booster respectively, a pair of packed telescoping sections, and flexible joints connecting said telescoping sections with said fixed sections, respectively.

6. In combination with a locomotive, a booster motor to drive certain wheels of the locomotive, and a steam supply pipe for the booster motor, a portion of which is of smaller internal diameter than the rest to check the inflow of steam to the booster in the event that said wheels slip and the booster tends to race.

7. In combination with a locomotive, a booster motor to drive certain wheels of the locomotive, and a steam supply pipe for the booster motor provided with means which acts to check the inflow of steam to the booster motor in the event that the booster tends to race.

8. In combination with a locomotive and its tender, the latter provided with a water tank, a booster motor associated with the locomotive, and means for introducing exhaust steam from the booster motor into the water tank on the tender at a constant distance below the water level therein regardless of changes in said level.

9. In combination with a locomotive and its tender, the latter provided with a water tank, a booster motor associated with the locomotive, and controllable means whereby the exhaust steam from the booster while in normal operation may be discharged either to the atmosphere or into the water tank of the tender.

10. In combination with a locomotive and a steam actuated booster motor associated therewith, a water tank and means for introducing exhaust steam from the booster into the tank comprising a pivoted pipe, and a float arranged thereon to keep the discharge end of the pipe at a fixed distance below the level of the water in the tank.

11. In combination with a locomotive and a steam actuated booster motor associated therewith, a water tank, a pipe for conducting exhaust steam from the booster motor, one end of which is open to the atmosphere, a valve to control the discharge from said pipe, and a branch pipe extending into the water in said tank.

12. In combination with a locomotive and a steam actuated booster motor associated therewith, a water tank, a pipe for conducting exhaust steam from the booster motor, one end of which is open to the atmosphere, a valve to control the discharge from said pipe, and a branch pipe pivoted to the first named pipe and provided with a float which keeps its discharge end at a constant distance below the water level in the tank.

13. In combination with a locomotive and its tender, the latter provided with a water tank, a booster motor associated with the locomotive, an exhaust steam pipe connected with the booster motor and extending upwardly through the tender and open to the atmosphere at its upper end, a valve in the upper end of said pipe, a pull rod to operate said valve from the locomotive cab, a branch pipe pivoted to the first named pipe, and a float thereon adapted to keep the discharge end of the branch pipe at a constant distance below the level of the water in the tank.

14. In combination with a locomotive and its tender, the locomotive having a truck supported on normally idle wheels, a booster motor located on said truck to drive said wheels, a steam supply pipe provided with a throttle valve located within the boiler, means located outside of the boiler for operating said throttle valve, said supply pipe comprising telescoping pipe sections and flexible joints connecting said telescoping sections to the adjacent portions of the pipe, an exhaust pipe connected with the booster motor and extending upwardly through the tender, a water tank in the tender, and a pivoted pipe section hinged to said exhaust steam pipe provided with a float for keeping its discharge end at a constant distance below the level of the water in said tank.

In testimony whereof, I have hereunto signed my name.

RAY M. BROWN.